United States Patent
Goto et al.

[11] Patent Number: 5,770,037
[45] Date of Patent: Jun. 23, 1998

[54] WATER PROCESSING METHOD

[75] Inventors: Nobutaka Goto, Tokyo, Japan; Peter S. Cartwright, South Minneapolis, Minn.

[73] Assignee: Konica Corporation, Japan

[21] Appl. No.: 752,999

[22] Filed: Nov. 21, 1996

[51] Int. Cl.⁶ .................................................... C02F 1/467
[52] U.S. Cl. .......................... 205/701; 205/742; 205/753; 205/754
[58] Field of Search .................................. 205/742, 753, 205/754, 701

[56] References Cited

U.S. PATENT DOCUMENTS

3,888,756  6/1975  Teshima et al. ..................... 204/275
3,919,062  11/1975  Lundquist, Jr. et al. ............... 205/753
5,256,268  10/1993  Goto et al. ............................ 204/268

*Primary Examiner*—Arun S. Phasge
*Attorney, Agent, or Firm*—Jordan B. Bierman; Bierman, Muserlian and Lucas

[57] ABSTRACT

A method for treating water with an electrolytic cell including an anode, a cathode, and a three-dimensional carbon electrode provided between the anode and the cathode, the method comprising the steps of supplying the water having an electric resistivity of not less than 10 MΩ·cm into the electrolytic cell; applying an electric current to the anode and the cathode so as to polarize the electrodes for sterilizing the water, wherein a first distance between the electrode and the anode and a second distance between the electrode and the cathode are not more than 1.0 mm.

8 Claims, 7 Drawing Sheets

WATER PROCESSING METHOD

BACKGROUND OF THE INVENTION

The present invention relates to a method for treating electrolytically water to be treated for inhibiting various deteriorations of performance thereof caused by microorganisms of the water to be treated containing microorganisms, especially of extrapure water, and thereby for sterilizing and maintaining quality of the water, and more particularly, relates to a method for enhancing, by treating electrolytically water to be treated containing microorganisms or having a possibility of generation of microorganisms such as extrapure water of various factories, heat exchanger cooling water using that extrapure water, or chemical-diluted water by using at least an electrolytic cell with an electrode of a fixed bed type, the effects of bacteriostasis and sterilization of microorganisms contained in each water to be treated mentioned above, including how to arrange electrodes, how to energize and how to add finishing steps.

Heretofore, various types of water solutions and pure water which does not contain any other materials have been used for various applications. With regard to these water solutions and others, when solutes thereof provide adequate nourishment, or when the temperature of the water solution is relatively high to be suitable for propagation of bacteria, microorganisms such as bacteria breed in the solution so that the microorganisms deteriorate the performance of the solution, or adversely affect products, or float or accumulate in a treating apparatus and frequently damage its function. The number of microorganisms in tap water is generally set to 30 /ml or less under the condition that residual chlorine stays in the tap water as a sterilizing agent. When this tap water is used as heat exchanger cooling water, for example, the aforementioned microorganisms breed by leaps and bounds, causing corrosion of piping and generation of an offensive odor.

In order to prevent these phenomena, various chemicals such as anti-mold agents or precipitation inhibiting agents have been added in water to be treated, or various kinds of filters have been installed in piping so far. However, there have been pointed out problems that the water to be treated is adversely affected by chemicals remaining from those added as stated above and the use of the chemicals requires a cost. Further, antibacterial activities for the chemicals added are started after a certain period of time, causing a problem of necessity for studying the chemicals to be used next and for adding more chemicals than needed. In addition, it is impossible in principle to filtrate and separate live bacteria through filter operations, and everlasting elimination of bacteria is impossible.

With regard to each water to be treated, drinking water, in particular, is directly related to human health. Therefore, exterminations of microorganisms such as sterilization of bacteria contained in the drinking water and prevention of propagation of mold therein are important, and a method by means of chlorine is dominant as a sterilization method or an anti-mold method. However, with regard to sterilization of tap water in urban area, its original water in rivers and lakes are contaminated with various kinds of organic matters, requiring addition of more chlorine than is needed. Therefore, there are caused disadvantages such as generation of organic halides and generation of the smell of bleach. In order to eliminate the aforementioned disadvantages caused by the method employing chlorine, there have been suggested sterilization methods employing those other than chlorine.

For overcoming the aforementioned disadvantages in each water to be treated mentioned above including drinking water, inventors of the invention proposed a water treatment apparatus and a water treatment method wherein the above-mentioned water to be treated is fed to an electrolytic cell equipped with an electrode of a carbon 3-D fixed bed type (hereinafter referred simply to also as an electrolytic cell) housing therein a plurality of electrodes of a carbon 3-D fixed bed type (hereinafter referred to also as a carbon electrode) to be treated electrolytically so that microorganisms in the water to be treated are sterilized.

This electrolytic sterilization method as it is called is necessary also for the manufacturing process of extrapure water and it is one wherein D.C. electric power or A.C. electric power with 10 Hz or less is supplied to the aforesaid carbon electrode and thereby the electrode is polarized and microorganisms coming in contact with electrodes mainly polarized to be positive are sterilized. This method has an advantage that sterilization of microorganisms can be continued as far as electric power is being supplied, and it is possible to operate economically by using a small amount of electricity for a long treatment time because no chemical such as chlorine or ozone is used.

Even in the case of a group of companies or the like using pure water or extrapure water, taking actions for microorganisms is important, and sterilization of the pure water before using is necessary, and it is desirable to use used extrapure water because an amount of impurities contained therein is not so large.

SUMMARY OF THE INVENTION

An object of the invention is to provide a water treatment method wherein the problems in prior art mentioned are solved, concentration of microorganisms can be kept low by electrolytic treatment using a carbon electrode even in the case of extrapure water having high specific resistance, and used extrapure water can be recycled by an inexpensive, simple and ordinary method to be used again as extrapure water.

The object mentioned above can be attained by either one of the following technical means (1)–(7).

(1) Water to be treated containing microorganisms is fed to an electrolytic cell equipped with electrodes of a carbon 3-D fixed bed type in which electrodes of a carbon 3-D fixed bed type are installed, and electric power is supplied to the electrolytic cell equipped with electrodes of a carbon 3-D fixed bed type and thereby the electrodes of a carbon 3-D fixed bed type are polarized. The polarized electrodes of a carbon 3-D fixed bed type are brought into contact with the microorganisms so that the microorganisms are sterilized in a water treatment apparatus. In a water treatment method for sterilizing microorganisms in water to be treated having specific electric resistance value of 10 MΩ·cm or more by the use of the water treatment apparatus mentioned above, the distance between the electrodes in the electrolytic cell equipped with electrodes of a carbon 3-D fixed bed type is made to be 0.1 mm or less during operation of the water treatment apparatus.

(2) Water to be treated containing microorganisms is fed to an electrolytic cell equipped with electrodes of a carbon 3-D fixed bed type in which electrodes of a carbon 3-D fixed bed type are installed, and electric power is supplied to the electrolytic cell equipped with electrodes of a carbon 3-D fixed bed type and thereby the electrodes of a carbon 3-D fixed bed type are polarized. The polazized electrodes of a carbon 3-D fixed bed type are brought into contact with the microorganisms so that the microorganisms are sterilized in a water treatment apparatus. In a water treatment method for sterilizing microorganisms in water to be treated having specific electric resistance value of 10 MΩ·cm or more by the use of the water treatment apparatus mentioned above, at least one of a filtrating equipment, an ion-exchange resin equipment, an ultraviolet irradiation equipment and an activated carbon adsorption treating equipment is used as a post-treatment equipment for the water treatment apparatus, during operation of the water treatment apparatus.

(3) The water treatment method described in the above item (1) or (2) characterized in that a net-shaped material made of an electrically insulating material is used as a spacer member forming a space between electrodes in the electrolytic cell equipped with electrodes of a carbon 3-D fixed bed type described in the above item (1) or (2).

(4) The water treatment method described in the above item (1) or (2) characterized in that a material of piping connected to a main body of the electrolytic cell and to the electrolytic cell itself of the electrolytic cell equipped with electrodes of a carbon 3-D fixed bed type described in the above item (1) or (2) is a high molecular organic material made of Teflon.

(5) The water treatment method described in the above item (1) or (2) characterized in that the direction of supplying electric power to the electrolytic cell is reversed periodically in the course of operation of the electrolytic cell equipped with electrodes of a carbon 3-D fixed bed type described in the above item (1) or (2).

(6) The water treatment method described in the above item (5) characterized in that an interval of the above-mentioned reversal of the direction is once or less in an hour.

Further, the concentration of microorganisms varies depending not only on how the electrolytic cell operates but also on other factors having no connection with electrolysis. In accordance with a water treatment method of the invention, therefore, when keeping the data showing that the electrolytic cell operated normally at the moment when an increase of the concentration of microorganisms became clear after 3 days from sampling of water to be treated, it is recognized that the increase of microorganisms was not caused by abnormal operation of the electrolytic cell, and it is possible to take other measures.

DETAILED DESCRIPTION OF THE INVENTION

Working of the invention will be explained in detail as follows.

With targets of water to be treated containing microorganisms or having a possibility of generation of microorganisms such as extrapure water in various factories, cleaning water used in factories for semiconductors and chemical-diluted water, especially of extrapure water requiring sufficient inhibition for mixing of microorganisms, the method of the invention relates to an operation method wherein the water to be treated is supplied to an electrolytic cell equipped with an electrode of a carbon 3-D fixed bed type, D.C. or A C. voltage or reversal D.C. voltage is impressed on the electrolytic cell to conduct sure bacteriostasis for microorganisms in the aforementioned water to be treated, and the extrapure water is recycled to be used again. The microorganisms in the invention include bacteria, germs, mold fungus, colon bacilli, yeast, slime mold, algae of a single cell, protozoans and viruses.

When water to be treated such as the extrapure water mentioned above is supplied to an electrolytic cell equipped with energized carbon electrodes, microorganisms in the water to be treated are brought by the liquid flow into contact with the polarized electrodes where the microorganisms receive energy at high voltage and powerful oxidation reaction takes place in a cell of the microorganisms accordingly, thus, its activity is weakened and microorganisms themselves are annihilated for sterilization.

In the above-mentioned electrolytic treatment of water to be treated, sterilization of microorganisms can be conducted as long as the carbon electrode mentioned above is polarized properly and the supplied water to be treated is surely brought into contact with the area which is polarized to be positive with voltage of 0.74 V (vs SCE) on the carbon electrode, but when either of the aforesaid two conditions is not satisfied, microorganisms are hardly sterilized.

Further, sterilization by means of electrolytic reaction is a reaction that is shown only when microorganisms come into contact with electrodes, therefore, nothing remains in water to be treated, which is different from addition of chemicals. Accordingly, microorganisms are mixed again in the water to be treated and are propagated with the passage of time.

For the above reasons, it is preferable to sterilize water to be treated immediately before an equipment using extrapure water, and a method wherein used water treated by at least one type of equipment selected, in accordance with a level of contamination of extrapure water, from a filtrating equipment, an ion-exchange resin equipment, an ultraviolet irradiation equipment and an activated carbon adsorption treatment equipment is circulated to a main equipment for making extrapure water, is preferable.

Generally, ranges of the aforesaid conditions suitable for electrolytic treatment are 5°–45° C. for temperature of water to be treated, 1–30 mm/sec for a value of linear velocity LV for passage in the electrolytic cell, 0–5000 μs/cm for electric conductivity of water to be treated, 2.0–8.0 V/electrolytic cell for electrolytic voltage, and 0–5.0 A/dm² for current density, and when the relation between a height of a carbon electrode housed in the electrolytic cell and the aforesaid linear velocity satisfies the following inequality, the water to be treated can be treated efficiently.

[Electrolytic cell height H (mm)]/[Linear velocity LV value (mm/sec)]≧1.0 (sec)

In this case, the height of the electrolytic cell H is a height of an electrode of a carbon 3-D fixed bed type, and when plural electrodes are insulated each other and laminated, the total value thereof is a height in mm.

The linear velocity LV value is a linear velocity in mm/sec at which the water to be treated runs through porous thin holes in the electrode of a carbon 3-D fixed bed type.

Since aforesaid conditions, including the temperature, the linear velocity LV value, the electric conductivity, and the current density, will vary while connecting them with each other, these values can be a good guide for the operation.

Especially, when water to be treated passes through the inside of a 3-D electrolytic cell spending the time represented by the above inequality, sterilization efficiency is high.

It was further found that the electrolysis efficiency is further stabilized when the linear velocity LV value is 30 mm/sec or less in addition to the condition mentioned above.

The basis for the above is that a turbulent flow in water to be treated is needed for microorganisms in the water to be treated to come in contact efficiently with the surface of the polarized electrode of a carbon 3-D fixed bed type. However, when the linear velocity LV value is too great, a period of time for water to be treated to be in contact with the aforesaid polarized surface is short, causing low efficiency. The upper limit value which does not lower the efficiency is the LV value stated above. While, the lower limit of the LV value is 1–2 mm/sec.

When sampling of treated water and measurement of microorganisms concentration in the sample are conducted simultaneously together with the recording of data mentioned above, and abnormality in microorganisms concentration is detected after a few days from acquisition of the data relating to the microorganisms concentration, then, it is possible to specify the item contributing to the abnormality of the microorganisms concentration among the conditions for the electrolysis, by comparing with changes with the passage of time. When the microorganisms concentration is kept to the satisfactory low level, it is possible to grasp that normal operation in accordance with the changes with the passage of time corresponding to each of the data is carried out. When no abnormality is observed on each of the data despite the abnormality of microorganisms concentration, it is supposed that abnormality of microorganisms concentration is caused by factors other than conditions for operation of the electrolytic cell, which makes it possible to check and investigate the other factors mentioned above.

It is estimated that whether or not a corporation can continue to exist depends on how it probes the causes for defects of its products to the bottom and how it makes them clear, after enforcement of a PL law, in particular. When the water treatment method of the invention is applied to extrapure water or to drinking water and medicines which are directly connected to human health, the influence thereof is especially great, and it sometimes happens that only data of microorganisms concentration are not sufficient to specify whether defects of products are caused by defects of an electrolytic cell and a treatment method employing the electrolytic cell or by other factors.

However, when various data relating to conditions for electrolysis are recorded for the future, these data can be combined with microorganisms concentration data obtained afterwards to specify the cause of defects of products surely.

Even when the microorganisms concentration is not abnormal, the data mentioned above can be used as an auxiliary data proving that electrolytic treatment was conducted normally.

An electrolytic cell used in a method of the invention is an electrolytic cell equipped with electrodes of a fixed bed 3-D type, namely, an electrolytic cell with an electrode of a fixed bed mono-electrode type and an electrolytic cell with electrodes of a fixed bed multi-electrode type. In these electrolytic cells, each of 3-D electrodes in the electrolytic cell has a large surface area, and accordingly, it is possible to increase a contact area between the surface of an electrode and water to be treated, and thereby it is possible to make the apparatus size small and to enhance efficiency of electrolytic treatment, which is an advantage.

An electrode in an electrolytic cell equipped with electrodes of a fixed bed 3-D type of the invention generally includes a carbon electrode presenting a polarizing phenomenon and an electrode for supplying electric power. The carbon electrode has its shape matching the aforementioned electrolytic cell to be used, and when an electrolytic cell with electrodes of a fixed bed multi-electrode type is used, it is feasible that the carbon electrode is made of carbon materials capable of transmitting the water to be treated mentioned above, for example, of carbon type materials such as activated carbon, graphite or carbon fiber each being felt-shaped, woven-cloth-shaped, and porous-block-shaped, and there is prepared an electrolytic cell with electrodes of a fixed bed multi-electrode type housing therein 3-D electrodes wherein D.C. voltage, A.C. voltage with 10 Hz or less or D.C. voltage reversing its polarity from time to time is impressed between power-supply-electrodes each being made of porous plate that is flat-plate-shaped, expand-mesh-shaped or perforated-plate-shaped installed at both ends of the carbon electrode to polarize the aforesaid electrode so that an anode can be formed on one end of the polarized electrode and a cathode can be formed on the other end thereof. In addition to the foregoing, it is also feasible to prepare an electrolytic cell with electrodes of a fixed bed multi-electrode type wherein carbon 3-D material functioning as an anode independently and carbon 3-D material functioning as a cathode independently are arranged alternately so that they are not short-circuited and are connected electrically.

Since the aforementioned electrode is made of carbon, it is oxidized by oxygen gas which is an electrolytic reaction product and an electrode crumbling sometimes takes place as carbon dioxide. For avoiding this, an electrode member wherein a base material such as titanium or the like is covered with platinum metallic oxide such as iridium oxide, ruthenium oxide or the like, or an electrode member wherein a base material such as porous material used generally as infusible metal electrode or titanium is covered with platinum metal through plating or the like can be provided to be in contact so that generation of oxygen may take place mainly on the porous material.

It is preferable that an average diameter of an opening of the aforementioned carbon electrode is 25–500 μm. When the carbon electrode is housed in the electrolytic cell for treating water to be treated, drinking water for example, characteristics of the carbon electrode have an influence on how the water to be treated can flow easily or on electrolysis voltage. A diameter of an opening of the carbon electrode also has an influence which is relatively strong, and when the diameter of an opening of the carbon electrode is great, the water to be treated can easily pass through the electrolytic cell without coming in contact with the electrode, resulting in lowered efficiency of sterilization of microorganisms. When the diameter of an opening is small, on the contrary, it is impossible for the water to be treated to pass through the carbon electrode, a rise in electrolysis voltage and pressure loss of liquid flow in the electrolytic cell are caused.

According to the studies of the inventors of the invention, when a diameter of an opening of a carbon 3-D electrode is smaller than 25 $\mu$m, a sharp rise in electrolysis voltage is caused, while when it exceeds 500 $\mu$m, a sharp fall of current efficiency (sterilization efficiency) is caused, thus, satisfactory effect (sterilization efficiency) can not be attained in both cases. When a carbon electrode is used for an electrolytic cell in a method of the invention, therefore, it is preferable that an average diameter of an opening thereof is made to be 25–500 $\mu$m as stated above. Porosity of the carbon electrode, (volume of void in electrode)÷(total volume of electrode)×100 (%) is 20–80% and it is preferably 30–60%.

It is possible to manufacture a carbon electrode having a desired diameter of an opening in the following method.

For example, when forming a carbon electrode by sintering carbon particles, it is possible to make a carbon electrode having an arbitrary diameter of an opening by adjusting a diameter of an opening of the carbon electrode by means of adjustment of a particle size of a carbon particle to be used. Sintering temperature in this case is 1000°–4000° C. and preferably is about 3800° C. In another method, sheets of cellulose paper each having a predetermined diameter of an opening are laminated to be graphitized at the similar sintering temperature.

When using an electrolytic cell with electrodes of a mono-electrode fixed bed type, a piece of 3-D material is provided in the electrolytic cell through a diaphragm or without a diaphragm, or a plurality of 3-D materials are provided in a single electrolytic cell in the state of the same electrolysis voltage.

Regardless of a type of the electrode to be used, when a void through which the water to be treated can flow without touching the electrode, exists in the electrolytic cell in which the water to be treated flows, efficiency of treating water to be treated is lowered. It is therefore preferable to arrange electrodes in the electrolytic cell so that the water to be treated in the electrolytic cell may not shortcut without touching the electrode.

Even when an anode chamber and a cathode chamber are formed by partitioning the inside of the electrolytic cell with a diaphragm, it is possible to supply electric power without using the diaphragm, but when using no diaphragm and narrowing the distance between poles of an electrode, it is possible to insert between both poles a net-shaped spacer made of organic high molecular material, for example, as an insulating spacer for preventing short-circuitting. When using a diaphragm, it is preferable to use a porous diaphragm such as, for example, one having a rate of hole area of not less than 10% and not more than 95%, preferably, not less than 20% and not more than 80%, so that a movement of flowing water to be treated is not disturbed, and the diaphragm is required to have fine holes each being enough in diameter at least to pass the above-mentioned water to be treated through.

Conditions for operating the electrolytic cell having the aforesaid constitution are preferably established so that sterilization efficiency for microorganisms in water to be treated may be highest.

When conducting electrolytic treatment in an electrolytic cell for water, there are available one-pass treatment and circulation treatment. For electrolytic treatment for drinking water, for example, it is difficult to use a circulation treatment though the sterilization efficiency rises in the circulation treatment. Therefore, one-pass treatment is usually used for electrolytic treatment of drinking water. For making extrapure water, however, it is preferable to use a circulation treatment. In the one-pass treatment, liquid hourly space velocity of water to be treated, in particular, among conditions for electrolysis, is made to be small to the utmost naturally to make the staying time of the water to be treated in the electrolytic cell longer. Therefore, the electrolytic cell tends to be large in size, which is a problem.

Figure 6:
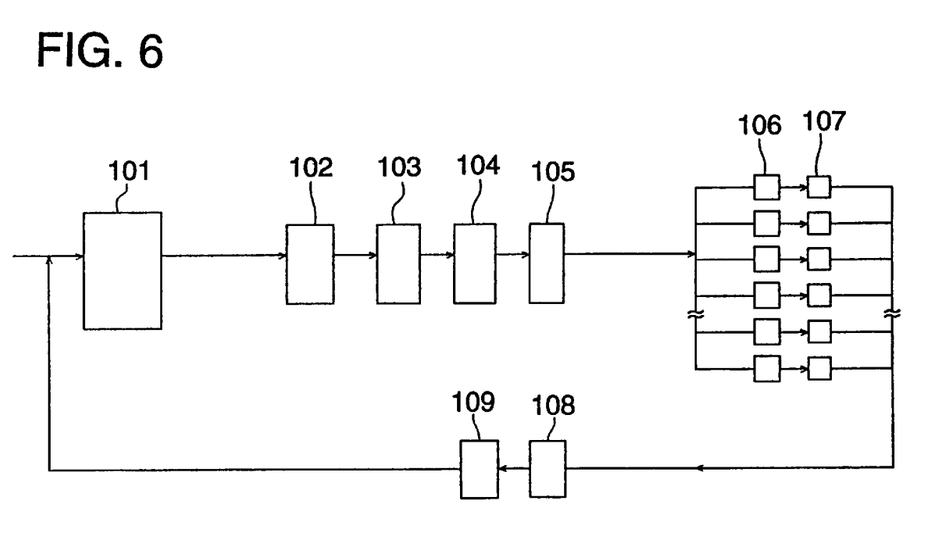
FIG. 6 is a flow chart showing an example of a water treatment method for a group in which extrapure water is used efficiently.

As stated above, the circulation treatment is preferable for treatment of extrapure water, and it can also be used for reusing extrapure water through circulation as shown in a flow chart in FIG. 6.

With regard to electrode voltage in the course of supplying water to be treated, it is preferable that anode voltage is set to be not more than +1.2 V (vs.SHE) and not less than+0.2 V (vs. SHE) as stated above. When the voltage is within this range, generation of oxygen gas and hydrogen gas caused by ordinary electrolytic reaction is very small in quantity but they are hardly observed. Therefore, it is possible to conduct sterilization treatment without considering generated gas which does not contribute to sterilization of the aforesaid microorganisms and without using electric power of electrolysis for generation of useless electrolysis gas which is not for sterilization of water to be treated and inhibits the sterilization treatment.

Incidentally, it is preferable that a filtrating device having a filter with an aperture of 10 $\mu$m or less, and of 5 $\mu$m or less for further certainty, is provided at an outlet of the electrolytic cell so that pieces of broken electrode of a carbon 3-D fixed bed type may be filtrated.

Next, referring to the drawings, there will be explained the preferable examples of an electrolytic cell of the invention to which the invention is not limited.

Figure 1:
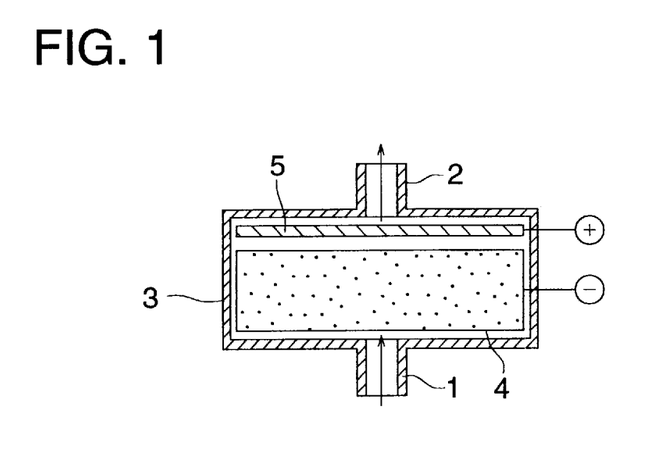
FIG. 1 is a schematic longitudinal cross section showing an example of an electrolytic cell equipped with an electrode of a mono-electrode carbon 3-D fixed bed type usable as an electrolytic cell in the method of the invention.

FIG. 1 is a schematic longitudinal cross section showing an example of an electrolytic cell equipped with an electrode of a mono-electrode carbon 3-D fixed bed type usable as an electrolytic cell in the method of the invention.

On the bottom portion of cylindrical electrolytic-bath main body 3 equipped at the center of its bottom plate and at the center of its top plate respectively with inlet 1 for water to be treated and outlet 2 for treated water, there is provided cathode of a carbon 3-D fixed bed type 4 which is a porous short cylinder made of carbon in a way that only a narrow clearance that substantially causes no liquid to flow is formed between the inner surface of the aforesaid main body 3, and above the cathode 4, there is provided anode 5 made of titanium material covered with mesh-shaped platinum metallic oxide, for example, or of titanium material covered, through a means such as plating or the like, with mesh-shaped platinum metal, together with some clearance. It is most preferable that the electrolytic cell 3 and piping connected thereto are made of high molecular material of Teflon as an electric insulating material capable of withstanding against the use for a long time or the repeated use. Comparing with synthetic resins such as polyepichlorohydrin, polyvinyl methacrylate, polyethylene, polypropylene, polyvinyl chloride, polyethylene chloride, phenol formaldehyde resin and polyacrylonitrile resin, in particular, the high molecular material of Teflon shows a great effect on removal of various dissolved ions as stated later in the case of extrapure water.

The electrolytic cell main body 3 having the constitution mentioned above is preferably provided on the half way of the piping used for extrapure water, for example, or provided at a point preceding an outlet for the extrapure water. However, when water to be treated that contains microorganisms is supplied to the main body 3 through its inlet 1, the water to be treated comes in contact with the bottom face of porous cathode 4, and removal of various dissolved ions caused by deposition of a hydroxide or an oxide corresponding to reduction of a metal ion component is caused on the surface of the cathode 4, thus, sterilization of the microorganisms takes place on the surface of the anode 5 and the sterilized water is taken out of the bath through the aforesaid outlet 2 for tap water. Incidentally, since liquid flows upward in the present electrolytic cell, hydrogen gas and oxygen gas generated slightly through electrolytic reaction are ejected out of the electrolytic cell easily together with flowing liquid.

Figure 2:
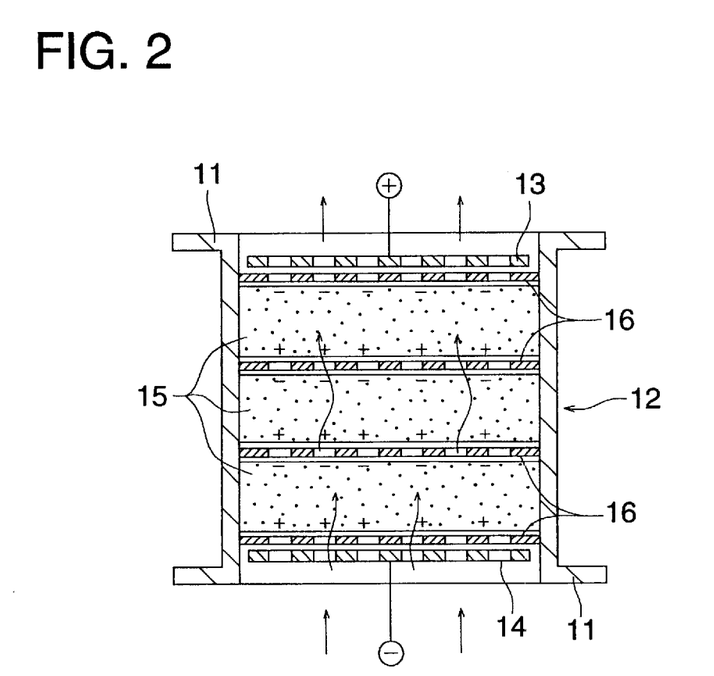
FIG. 2 is a schematic longitudinal cross section showing an example of an electrolytic cell equipped with electrodes of a multi-electrode carbon 3-D fixed bed type usable as an electrolytic cell in the method of the invention.

FIG. 2 is a schematic longitudinal cross section showing an example of an electrolytic cell equipped with electrodes of a carbon 3-D fixed bed type usable as an electrolytic cell in the method of the invention.

Cylindrical electrolytic cell 12 having flange 11 on each of its top and bottom is provided at its upper portion and lower portion inside therein respectively with power-supplying anode terminal 13 and power-supplying cathode terminal 14 both being mesh-shaped. Between these electrode terminals 13 and 14, there are laminated plural, three in the illustrated example, porous electrodes of a carbon 3-D fixed bed type (carbon electrodes) 15, and four mesh-shaped diaphragms or spacers 16 are sandwiched between the carbon electrodes 15, between the carbon electrode 15 and the electrode terminal 13 and between the carbon electrode 15 and the electrode terminal 14. Each carbon electrode 15 is arranged to be in close contact with the inner surface of the electrolytic cell main body 12 so that an amount of water to be treated flowing between the carbon electrode 15 and the inner surface of the electrolytic cell main body 12 without passing through the inside of the carbon electrode 15 may be small to the utmost.

When energizing the electrolytic cell having the constitution mentioned above while supplying water to be treated from the bottom of the electrolytic cell as shown by an arrow, each of the fixed bed electrode 15 is polarized to be positive at its bottom surface and negative at its top surface and a porous anode is formed on the bottom surface of each fixed bed electrode 15, thus, the water to be treated comes in contact with this porous anode to be sterilized, and then is guided to a cock after being taken out toward the upper portion of the electrolytic cell.

Figure 3:
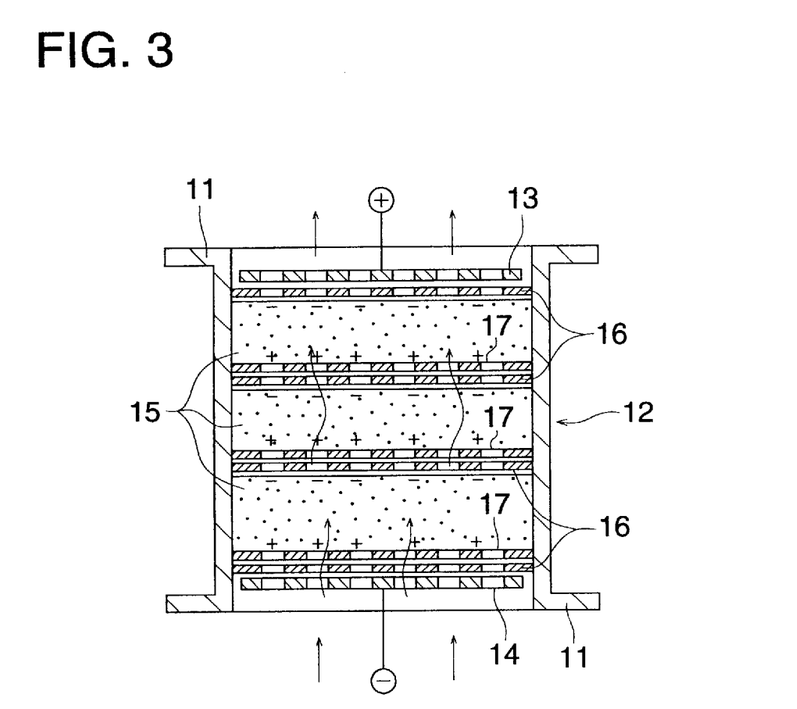
FIG. 3 is a schematic longitudinal cross section showing another example of an electrolytic cell equipped with electrodes of a multi-electrode carbon packed 3-D bed type usable in the method of the invention.

FIG. 3 represents another example of an electrolytic cell with electrodes of a multi-electrode fixed bed type usable for the method in the invention, wherein mesh-shaped infusible metal electrode 17 is provided to be in close contact with the side of the carbon electrode 15 of the electrolytic cell closer to the power supplying cathode 14 in FIG. 2, namely the side to be polarized to be positive, and other members are the same as those in FIG. 2, therefore, they are given the same symbols and explanation therefor will be omitted hear.

Carbon electrode 15 impressed with D.C. voltage is polarized to the utmost at its both ends, and when generation of gas is caused, gas generation tends to occur at both ends of the carbon electrode 15. Therefore, an end portion of the carbon electrode 15 polarized most strongly, namely subjected to gas generation most actively, and is closer to power supplying cathode 14 is subjected to oxidation reaction and dissolution reaction of base material of an electrode which are quickest and most active. When this portion is provided with infusible metal electrode 17 as illustrated, oxygen gas is mostly generated from the infusible metal electrode 17 and carbon electrode 15 hardly generates oxygen gas, resulting in effective inhibition of crumbling of the carbon electrode 15. Water to be treated supplied to the electrolytic cell is treated in the same manner as in FIG. 2 so that microorganisms in the water to be treated are sterilized.

Figure 4:
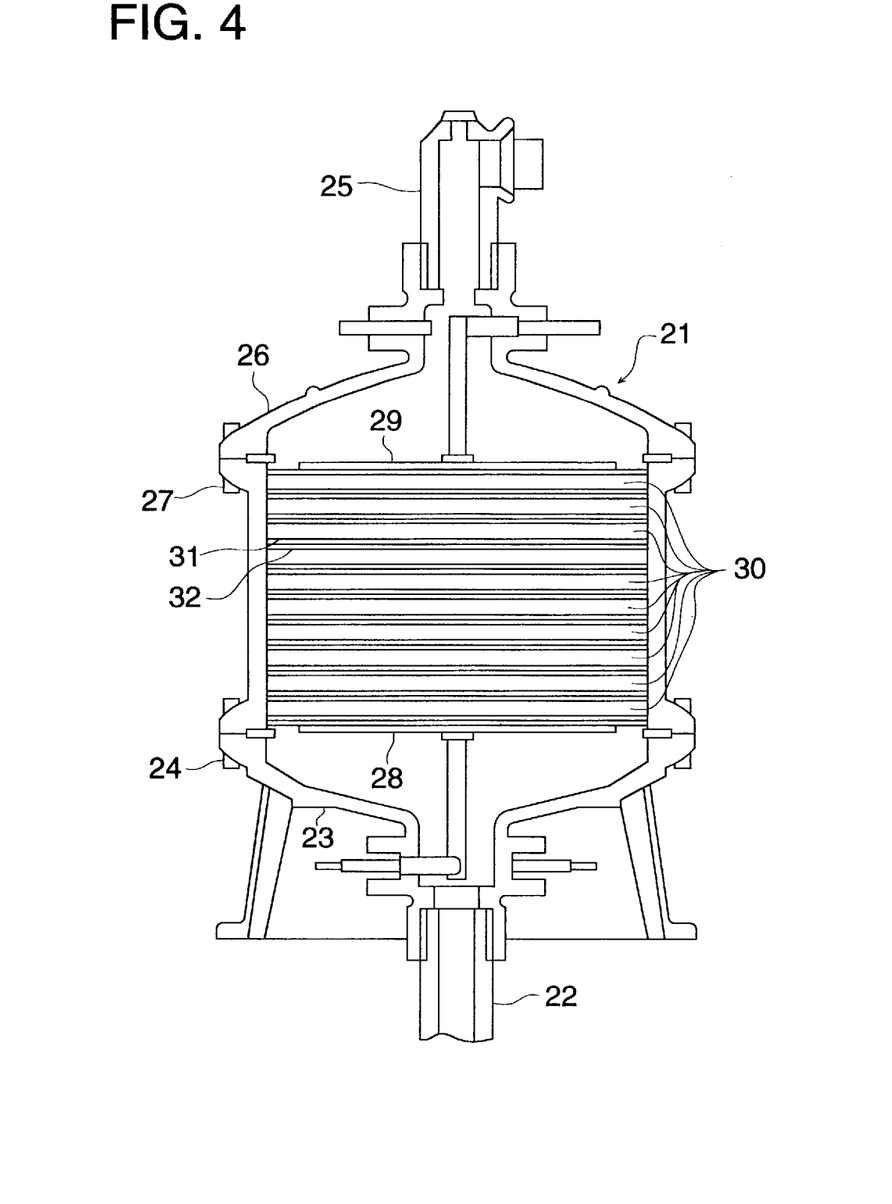
FIG. 4 is a schematic longitudinal cross section showing still another example of an electrolytic cell equipped with electrodes of a multi-electrode carbon 3-D fixed bed type usable in the method of the invention.

FIG. 4 is a longitudinal cross section showing still another example of an electrolytic cell with electrodes of a multi-electrode fixed bed type usable in the method of the invention.

At the lower portion of hollow and cylindrical electrolytic cell main body 21, there is connected bowl-shaped bottom plate 23 having tap water inlet 22 at its center position with clamp 24, and at the upper portion of the electrolytic cell main body 21, there is connected bowl-shaped top plate 26 having treated water outlet 25 at its center position with clamp 27. At a portion inside the electrolytic cell main body 21 positioned above the water to be treated inlet 22, there is provided disk-shaped power supplying anode terminal 28, and at a portion inside the electrolytic cell main body 21 positioned below the treated water outlet 25, there is provided disk-shaped power supplying cathode terminal 29.

Between both terminals 28 and 29 in the illustrated example, there are laminated 10 carbon electrodes 30 with infusible metal electrode 31 identical to that in FIG. 3 and spacer 32 located between the infusible metal electrode and the electrode both sandwiched between each coupled carbon electrodes. Each carbon electrode 30 is arranged to be in close contact with the inner wall of electrolytic cell main body 21 so that an amount of water to be treated flowing between the carbon electrode 30 and the inner wall of the electrolytic cell main body 21 without flowing through the inside of the carbon electrode 30 may be small to the utmost.

When the electrolytic cell having the constitution mentioned above is energized while supplying water to be treated through inlet 22 for water to be treated, each carbon electrode 30 mentioned above is polarized to be negative at its bottom surface and positive at its top surface, and a porous anode is formed on the top surface of each carbon electrode 30. The water to be treated mentioned above comes in contact with the porous anode to be sterilized, and taken out toward the upper portion of the electrolytic cell to be guided to a cock.

Figure 5:
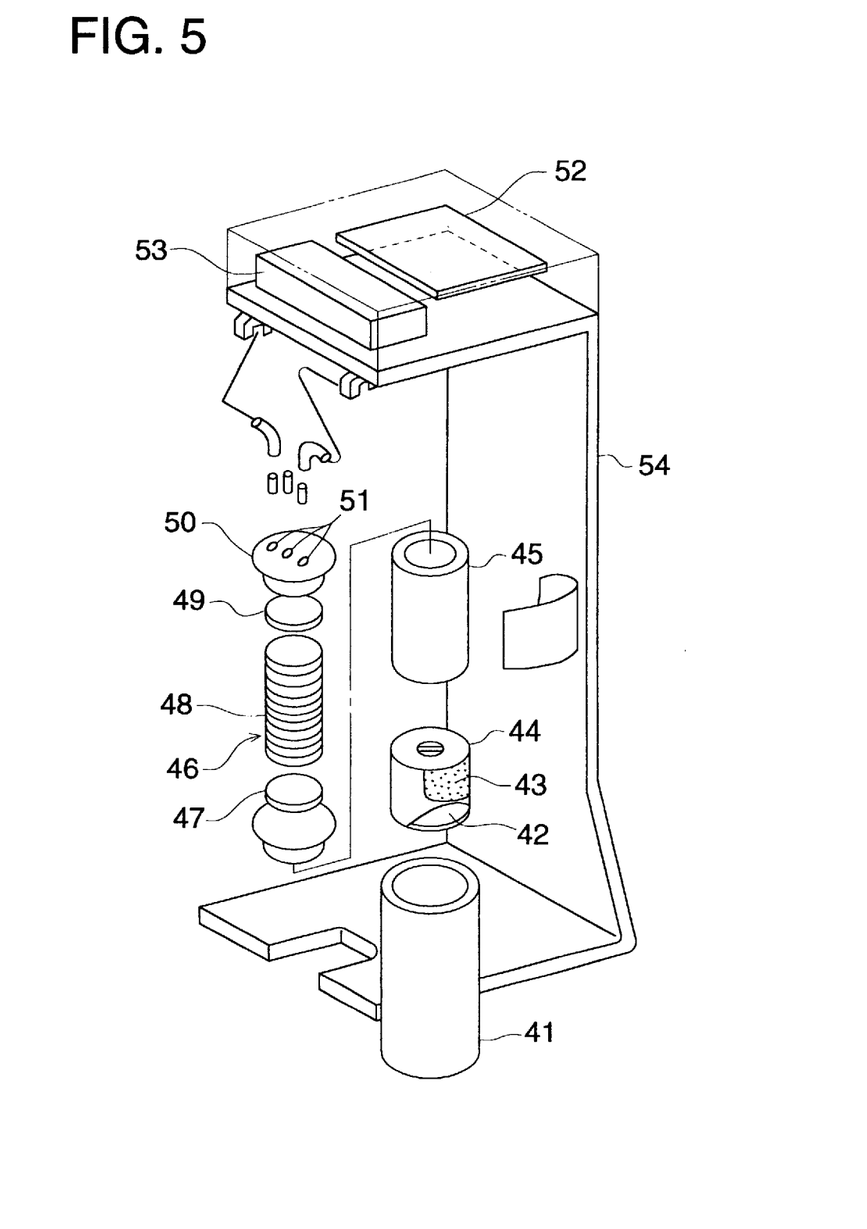
FIG. 5 is an exploded perspective view showing still more another example of an electrolytic cell equipped with electrodes of a multi-electrode carbon 3-D fixed bed type usable in the method of the invention.

FIG. 5 is an exploded perspective view showing still another example of an electrolytic cell equipped with electrodes of a multi-electrode carbon 3-D fixed bed type usable in a method of the invention.

At an inner and lower portion of hollow and cylindrical casing 41, there is provided cartridge 44 housing therein filter 42 and activated carbon 43. On the cartridge 44, there is provided electrolytic cell constituent member 46 housed in electrolytic cell main body 45 representing a cylindrical holding member bath. The electrolytic cell constituent member 46 is provided with power supply anode terminal 47, a fixed bed electrode unit wherein 10 carbon electrodes 48 and the aforesaid protective electrodes made of metal are set, and power supply cathode terminal 49 in this order from the bottom. On top plate 50 of the electrolytic cell main body 45, there are provided three through-holes 51 which are respectively for a water to be treated supply pipe, a treated water take out pipe and a ventilation hole for draining.

This electrolytic cell main body 45 is fixed on U-shaped mounting stand 54 having on its top portion data recording circuit and D.C. power supply circuit 52 and data display board 53, and is utilized for monitoring electrolytic treatment.

FIG. 6 is a flow chart showing an example of an embodiment of a water treatment method of the invention installed in a group where water to be treated, extrapure water, for example, is used efficiently.

Extrapure water fed from a reservoir in extrapure water making facilities including an electrolytic cell passes through at least one of reverse permeation diaphragm (102), ion exchange resin (103), activated carbon adsorption equipment (104) and ultraviolet irradiation equipment (105), to become extrapure water, and it is distributed to each location (107) to be used there, through electrolytic cell B (106). Used extrapure water is then deprived of contaminated impurities in the later step of treatment, such as treatment with the reverse permeation diaphragm (108) or that with the ion exchange resin (109), for example, and then is returned to an inlet of electrolytic cell A (101) installed at a location preceding a main apparatus equipped with at least one of the reverse permeation diaphragm (102), ion exchange resin (103), activated carbon adsorption equipment (104) and ultraviolet irradiation equipment (105), so that circulative treatment may be repeated automatically in the above system.

At least one of the above-mentioned reverse permeation diaphragm (102), ion exchange resin (103), active carbon adsorption equipment (104) and ultraviolet irradiation equipment (105) is provided as an after-treatment equipment for the electrolytic cell A (101), and it lighten a load of each equipment making mainly extrapure water.

A pair of power supply electrodes located at both ends of the aforesaid carbon electrode are used for energizing the carbon electrode. When polarities of the both power supply electrodes are not changed, the carbon electrode has always the same polarization characteristics, namely, a portion of the carbon electrode in the vicinity of the positive power supply electrode is polarized to be negative, and a portion of the carbon electrode in the vicinity of the negative power supply electrode is polarized to be positive. Sterilization of microorganisms generally takes place at a portion polarized to be positive on a carbon electrode, and it hardly takes place at a portion polarized to be negative.

When a polarity of an electrode for power supply for voltage impression in the course of supplying water to be treated is kept to be the same, there is a possibility that sterilzation of microorganisms and prevention of their breeding take place only on the side polarized to be positive on the carbon electrode, and breeding of microorganisms can not be inhibited on the side polarized to be negative.

In addition, wear and tear of the carbon electrode mainly take place only on the anode side, and one side only is damaged accordingly.

Therefore, when intermittent impression of voltage in the course of supplying water to be treated mentioned above is performed while reversing the polarity of an electrode for power supply, namely, when a certain voltage impression is conducted making a power supply electrode on one side to be positive and making that on the other side to be negative, and next voltage impression is conducted making the aforesaid power supply electrode on one side to be negative and making that on the other side mentioned above to be positive, positive polarization and negative polarization appear almost equally on both sides of the polarized carbon electrode. Thus, breeding of microorganisms can be inhibited effectively on the most area of the carbon electrode.

EXAMPLE

The invention will be explained in detail as follows, referring to the examples to which an embodiment of the invention is not limited.

There will be explained as follows an example of treatment of water to be treated such as extrapure water or the like, which does not limit methods of the invention.

Example 1

An electrolytic cell of the present example was prepared in accordance with the following constitution.

In a cylindrical electrolytic cell with flanges shown in FIG. 2 being made of Teflon high molecular organic material (PTFE) having a height of 75 mm and inside diameter of 40 mm, there were put five fixed beds (porous graphite, G-100 S made by Tokai Carbon Co.) made of carbon fiber and having a diameter of 39.5 mm and a thickness of 10 mm, and they were sandwiched be six Teflon-resin-made diaphragms each having a rate of hole area of 80%, a diameter of 40 mm and a thickness of 1 mm, in a way that each fixed bed was sandwiched by the diaphragms. Then, mesh-shaped power supply anode and cathode each being made of titanium that is plated with platinum, having a diameter of 38 mm and a thickness of 1 mm were brought into contact respectively with the top diaphragm and the bottom diaphragm. Thus, the electrolytic cell of the present example was prepared.

Water to be treated for testing was prepared by adding microorganisms to extrapure water representing the water to be treated at the rate of 800 pieces/ml.

Then, the water to be treated for testing was subjected to electrolytic treatment by supplying it to the electrolytic cell through its bottom at the rate of 1.5 l/min. and by adjusting to obtain apparent current density of 0.2 $A/dm^2$ and electrolytic voltage of 4.3–8.8 V (average electrolytic voltage 5.8 V) by means of D.C. power source.

Under the conditions mentioned above, the electrolytic cell was operated continuously for 15 days, and data such as a temperature, an amount and electric conductivity of the water to be treated as well as voltage and current for the electrolytic cell were stored in a computer. In addition, treated water was taken out of the electrolytic cell hourly for sampling, and each of them was cultured for three days, during which the number of microorganisms was counted hourly. Results of them are shown in Table 1.

TABLE 1

| Operation time (hr) | Micro-organism concentration (pcs./ml) | Temperature of water to be treated (°C.) | Amount of water to be treated (l/min.) | Conductivity of water to be treated (μs/cm) | Electrolitic voltage (V) | Current (mA) | Number of micro-organisms in treated water (pcs/ml) |
|---|---|---|---|---|---|---|---|
| 0 | 8 | 23 | 1.51 | 0.061 | 5.6 | 2.8 | 0 |
| 1 | 10 | 22 | 1.50 | 0.058 | 5.7 | 2.9 | 0 |
| 5 | 9 | 23 | 1.52 | 0.083 | 5.7 | 3.0 | 1 |
| 10 | 7 | 24 | 1.51 | 0.071 | 5.5 | 3.3 | 0 |
| 15 | 8 | 23 | 1.51 | 0.068 | 5.6 | 3.0 | 0 |
| 20 | 8 | 24 | 1.52 | 0.065 | 5.6 | 3.1 | 0 |
| 24 | 7 | 20 | 1.50 | 0.062 | 5.8 | 2.6 | 1 |
| 36 | 8 | 22 | 1.51 | 0.060 | 5.6 | 2.8 | 0 |
| 48 | 9 | 22 | 1.52 | 0.061 | 5.8 | 2.6 | 0 |
| 60 | 8 | 20 | 1.50 | 0.063 | 5.6 | 2.9 | 0 |
| 72 | 8 | 20 | 1.50 | 0.066 | 5.6 | 2.6 | 0 |

In the method identical to that in Example 1, even when the thickness of the diaphragm made of Teflon resin was changed to 0.1, 0.3 and 0.5 mm, there was shown sterilization efficiency identical to that in Table 1. However, when they were increased to 1.1, 1.3 and 1.5 mm, it was found that the number of microorganisms in treated water was increased. The results of them in a form of a graph are shown on a diagram in FIG. 7.

Figure 7:
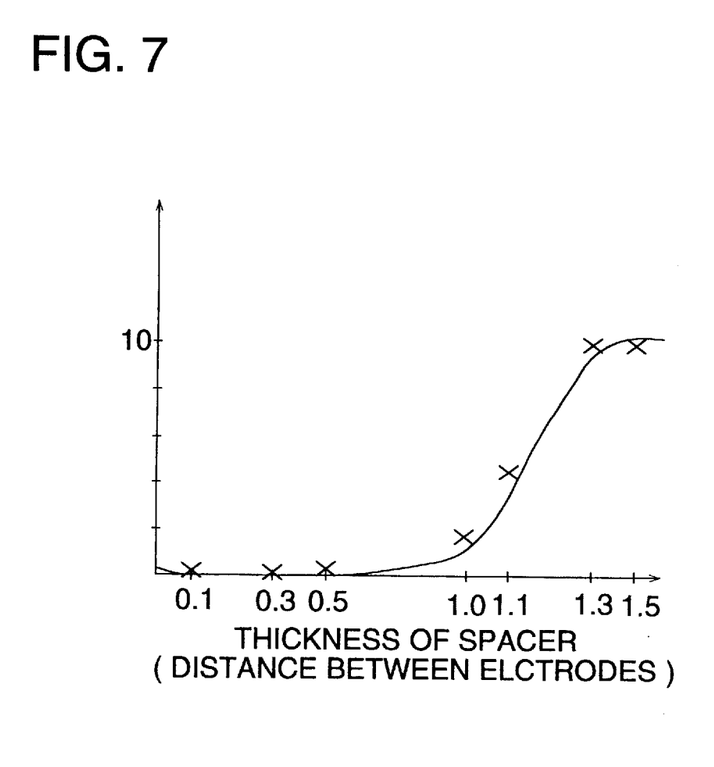
FIG. 7 is a diagram showing how a distance between electrodes relates to efficiency of sterilization.

FIG. 7 gives an understanding that better sterilization efficiency can be shown when the thickness of the diaphragm made of Teflon resin is 1.0 mm or less.

In this case, the diaphragm made of Teflon resin prescribes substantially a distance between 3-D carbon fiber electrodes adjoining each other, a distance between a 3-D carbon fiber electrode and a feeding cathode and a distance between a 3-D carbon fiber electrode and a feeding anode.

In the case of the diaphragm made of Teflon resin whose thickness is 1.0 mm or more, when processing water having specific electric resistance of 10 MΩ·cm or more, a level of resistance between electrodes is too high, and it is considered that voltage drop is caused, an amount of potential energy on a 3-D carbon fiber electrode is lowered, resulting in inability of obtaining sufficient sterilization efficiency.

Example 2

Next, the electrolytic cell same as that in Example 1 was used for Example 2, and an amount of water to be treated was increased intentionally. The treated water was taken out for sampling in the same manner as in Example 1, and each of them was cultured for three days, during which the number of microorganisms was counted hourly. Results of them are shown in Table 2.

TABLE 2

| Operation time (hr) | Micro-organism concentration (pcs./ml) | Temperature of water to be treated (°C.) | Amount of water to be treated (l/min.) | Conductivity of water to be treated (μs/cm) | Electrolitic voltage (V) | Current (mA) | Number of micro-organisms in treated water (pcs/ml) |
|---|---|---|---|---|---|---|---|
| 0 | 8 | 22 | 2.01 | 0.063 | 5.6 | 2.7 | 7 |
| 1 | 8 | 22 | 2.08 | 0.060 | 5.6 | 2.9 | 1 |
| 5 | 9 | 23 | 1.93 | 0.059 | 5.6 | 2.6 | 6 |
| 10 | 8 | 22 | 1.96 | 0.065 | 5.7 | 3.1 | 7 |
| 15 | 10 | 22 | 1.86 | 0.062 | 5.6 | 2.9 | 9 |
| 20 | 8 | 23 | 1.97 | 0.060 | 5.8 | 2.8 | 6 |
| 24 | 7 | 21 | 1.96 | 0.059 | 5.5 | 2.7 | 7 |
| 36 | 7 | 22 | 2.08 | 0.061 | 5.7 | 2.3 | 5 |
| 48 | 8 | 21 | 1.88 | 0.063 | 5.7 | 2.2 | 6 |
| 60 | 6 | 20 | 1.91 | 0.064 | 5.5 | 2.9 | 6 |
| 72 | 9 | 22 | 1.97 | 0.064 | 5.6 | 3.1 | 7 |

Example 3

Next, the electrolytic cell same as that in Example 1 was used for Example 3, and electrolytic voltage was decreased intentionally. The treated water was taken out for sampling same manner as in Example 1, and each of them was cultured for three days, during the number of microorganisms was counted hourly. Results of them are shown in Table 3.

TABLE 3

| Operation time (hr) | Micro-organism concentration (pcs./ml) | Temperature of water to be treated (°C.) | Amount of water to be treated (l/min.) | Conductivity of water to be treated (μs/cm) | Electrolitic voltage (V) | Current (mA) | Number of micro-organisms in treated water (pcs/ml) |
|---|---|---|---|---|---|---|---|
| 0 | 9 | 22 | 1.51 | 0.063 | 4.2 | 1.4 | 5 |
| 1 | 8 | 22 | 1.50 | 0.060 | 3.8 | 1.3 | 4 |
| 5 | 8 | 22 | 1.59 | 0.058 | 3.8 | 1.2 | 6 |

TABLE 3-continued

| Operation time (hr) | Micro-organism concentration (pcs./ml) | Temperature of water to be treated (°C.) | Amount of water to be treated (l/min.) | Conductivity of water to be treated (μs/cm) | Electrolitic voltage (V) | Current (mA) | Number of microorganisms in treated water (pcs/ml) |
|---|---|---|---|---|---|---|---|
| 10 | 7 | 23 | 1.50 | 0.059 | 3.5 | 1.3 | 6 |
| 15 | 8 | 23 | 1.51 | 0.064 | 4.1 | 1.5 | 5 |
| 20 | 7 | 24 | 1.51 | 0.063 | 3.3 | 1.3 | 4 |
| 24 | 8 | 23 | 1.51 | 0.061 | 4.8 | 1.4 | 5 |
| 36 | 8 | 23 | 1.50 | 0.063 | 3.9 | 1.4 | 6 |
| 48 | 9 | 22 | 1.50 | 0.060 | 3.0 | 1.3 | 5 |
| 60 | 7 | 24 | 1.51 | 0.064 | 3.1 | 1.2 | 5 |
| 72 | 8 | 22 | 1.50 | 0.061 | 3.7 | 3.5 | 6 |

As is apparent from Table 1, when the microorganism concentration was at a satisfactory level, values with the passage of time for the aforementioned data were almost constant. It was therefore confirmed not only from the counted microorganism concentration but also from the recorded data that the electrolytic cell was operated properly. However, when the microorganism concentration was not lowered sufficiently as shown in Table 2 and Table 3, an amount of water to be treated and electrolytic voltage showed abnormality, and it is possible to identify the cause of a rise of microorganism concentration by comparing the microorganism concentration obtained usually after 2–3 days from sampling with data.

Example 4

Following experiment was conducted by using the electrolytic cell and extrapure water same as those used in Example 1. With regard to impression of D.C. voltage, the direction of energizng was reversed hourly as shown in FIG. 8, and it was also kept constant as shown in FIG. 9 as a comparative experiment.

For both former and latter cases, treated water was sampled through an outlet immediately after the start of supplying water and energizing to be cultured for three days, and the number of microorganisms was counted. After that, it was found that there was no difference between both cases. Namely, it was possible to confirm that the number of microorganisms was almost zero, and this highly sterilized state can last.

Figure 8:
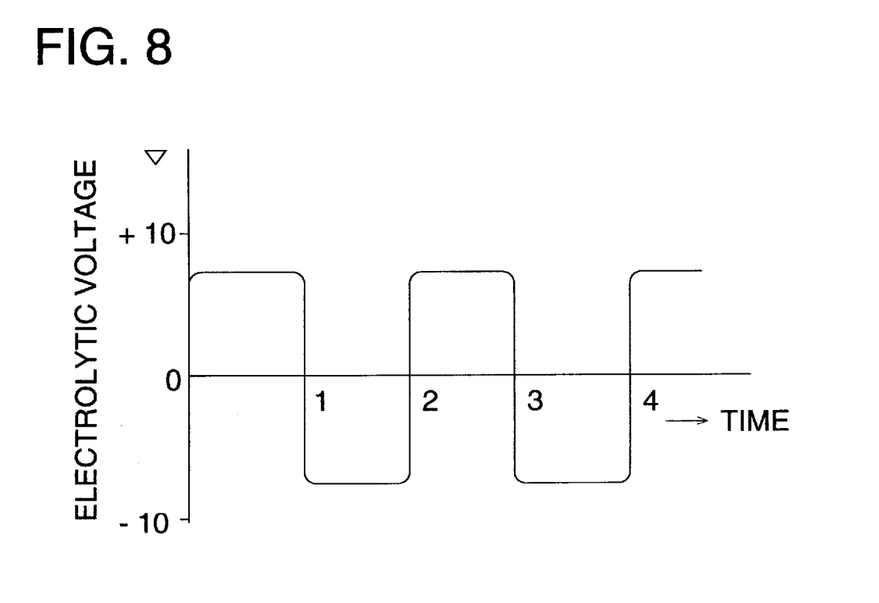
FIG. 8 is a voltage-time diagram wherein the direction of applying D.C. electrolytic voltage on an electrolytic cell is switched at regular intervals.
Figure 9:
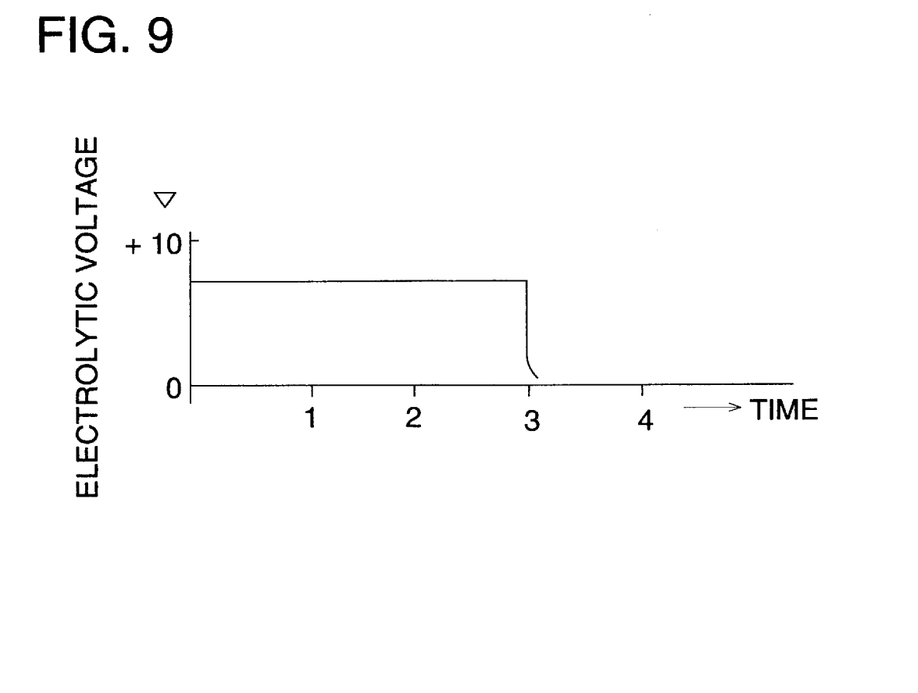
FIG. 9 is a voltage-time diagram wherein the direction of applying D.C. electrolytic voltage on an electrolytic cell is kept constant.

Energizing and supplying water were suspended after 3 hours, and then started again after 12 hours wherein extrapure water (containing microorganisms) same as that used in Example 1 was supplied to the electrolytic cell used for operation in FIG. 8 and to that used for operation in FIG. 9, and treated water was sampled through an outlet of the electrolytic cell and cultured for three days for counting the number of microorganisms. The number of microorganisms from the equipment employing reversed power source shown in FIG. 8 was almost 0 pcs/ml, while that from the equipment shown in FIG. 9 was about 200 pcs/ml, and it was found that the former case was more excellent.

The foregoing shows that the number of residual microorganisms in an electrolytic cell in the former case wherein the positive side of polarization is formed on the upper and lower sides of a carbon electrode alternately is less than that in the latter case wherein it is formed only on the upper or the lower side.

Incidentally, an interval for changing the energizing direction was set to 1 hour in the present example. However, the invention is not limited to it. Incidentally, changing the energizing direction can be attained by means of an appropriate circuit.

Example 5

An electrolytic cell main body used in a method of the invention and piping connected thereto were made of tetrafluorised Teflon material (PTFE), and extrapure water was prepared through the flow shown in FIG. 7, and data other than the number of microorganisms in the obtained extrapure water were as follows.

| | |
|---|---|
| Electric resistance | 18 MΩ · cm |
| Si concentration | 4 μg/l or less |
| TOC | 40 μg/l or less |
| $Cu^{++}$ concentration | 1 μg/l or less |
| $Cl^-$ concentration | 1.5 μg/l or less |
| $K^+$ concentration | 1.5 μg/l or less |
| $Na^+$ concentration | 1 μg/l or less |
| Residual solid substance | 8 μg/l or less |
| $Zn^{++}$ concentration | 4 μg/l or less |

However, the values for the occasion where a material of polyethylene or the like was used for the electrolytic cell main body and piping exceeded the above data extremely.

When water to be treated having specific electric resistance of 10 MΩ·cm or more is supplied to an electrolytic cell of a fixed bed 3-D electrode type used in a method of the invention, microorganisms in the water to be treated come into contact with a voltage-donated carbon electrode, and on the surface of the carbon electrode, the microorganisms are brought into contact with current at high voltage and are subjected to strong oxidation reaction to be weakened in activity or exterminated, resulting in sterilization.

Further, it was found that stability efficiency of sterilization can be attained when intervals of plural carbon electrodes are set to 1.0 mm or less. It was also possible to keep electrolytic treatment with stabilized insulating relation between electrodes by using a mesh-shaped member prepared by processing electrically insulating material, as a spacer member that determines the distance between the electrodes.

Further, when the energizing direction is reversed in the course of operation of an electrolytic cell, both sides of a carbon electrode can contribute to sterilization. Therefore, efficiency of sterilization is enhanced and wear and tear of an electrode is reduced.

It was possible to recycle and use again pure water and extrapure water effectively by connecting a filtrating equipment, an ion exchange resin equipment, an activated carbon adsorption equipment and an ultraviolet irradiation equipment as after-steps of the water-treatment equipment composed of an electrolytic cell, depending on how extrapure water is contaminated.

By using tetrafluorised Teflon resin material (PTFE) for an electrolytic cell main body and piping connected thereto, there was attained great effect for preventing elution of various ions which are indispensable for extrapure water.

In an electrolytic sterilization method, it is not possible to measure immediately concentration of microorganisms in treated water taken out of the electrolytic cell, and about three days are usually needed for specifying the concentration of microorganisms. Therefore, there is no means which can judge directly whether the electrolytic cell is operating properly or not while it is operating. In the water treatment method of the invention, it is possible to investigate and check the state of operation including whether an electrolytic cell was operating properly or not, by recording at least one kind of data of the aforesaid operation conditions in the course of operation of the electrolytic cell and by comparing the aforesaid data with the microorganism concentration after it is specified.

What is claimed is:

1. A method for removing microorganisms from water using an electrolytic cell including an anode, a cathode, and a three-dimensional carbon electrode provided between the anode and the cathode, the method comprising the steps of:

supplying the water having an electric resistivity of not less than 10 MΩ·cm into the electrolytic cell; and applying an electric current to the anode and the cathode so as to polarize the electrodes for sterilizing the water, wherein a first distance between the electrode and the anode and a second distance between the electrode and the cathode are not more than 1.0 mm.

2. The method of claim 1, wherein a electrolytic cell includes a plurality of the electrodes and a third distance between each of the electrodes is not more than 1.0 mm.

3. The method of claim 1, further comprising the steps of, treating the sterilized water with filtering, passing through an ion-exchange resin, ultraviolet rays irradiating, or absorbing through active carbon.

4. The method of claim 1, wherein a spacer member is provided between the electrode and the anode, between the electrode and cathode.

5. The method of claim 4, wherein a spacer member is made of a net-shaped electrically insulated material.

6. The method of claim 1, wherein a main body of the electrolytic cell is made of a polytetrafluoroethylene.

7. The method of claim 1, wherein the electric current applying to the electrodes is reversed periodically.

8. The method of claim 7, wherein an interval of reversal is less than once in an hour.

* * * * *